US009623964B2

United States Patent
Baskin et al.

(10) Patent No.: US 9,623,964 B2
(45) Date of Patent: Apr. 18, 2017

(54) COUNTER-ROTATING ROTOR SYSTEM WITH STATIONARY STANDPIPE

(71) Applicant: Sikorsky Aircraft Corporation, Stratford, CT (US)

(72) Inventors: Bryan Kenneth Baskin, Arlington, TX (US); Kendall Wedman, Wichita, KS (US); Todd A. Garcia, Mansfield, TX (US); Charles Duello, Burleson, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 700 days.

(21) Appl. No.: 14/071,987

(22) Filed: Nov. 5, 2013

(65) Prior Publication Data

US 2015/0125299 A1    May 7, 2015

(51) Int. Cl.
    *B64C 27/10*    (2006.01)
    *B64D 35/04*    (2006.01)
    *B64C 27/12*    (2006.01)
    *B64D 35/06*    (2006.01)

(52) U.S. Cl.
    CPC .............. *B64C 27/10* (2013.01); *B64C 27/12* (2013.01); *B64D 35/04* (2013.01); *B64D 35/06* (2013.01)

(58) Field of Classification Search
    CPC ......... B64C 27/10; B64C 27/12; B64D 35/04; B64D 35/06
    See application file for complete search history.

(56) References Cited

U.S. PATENT DOCUMENTS

| 2,481,290 | A | * | 9/1949 | Clark | B64D 35/04 74/410 |
| 2,948,490 | A | * | 8/1960 | Munoz Verdugo | B64C 1/00 244/17.19 |
| 4,525,123 | A | * | 6/1985 | Curci | B64C 27/54 416/114 |
| 5,058,824 | A | * | 10/1991 | Cycon | B64C 39/024 244/17.13 |
| 5,351,913 | A | | 10/1994 | Cycon et al. | |
| 5,791,592 | A | | 8/1998 | Nolan et al. | |

(Continued)

OTHER PUBLICATIONS

Notification of Transmittal of the International Search Report and the Written Opinion of the International Searching Authority, or the Declaration; PCT/US14/62839; Mailed Feb. 20, 2015; 12 pages.

*Primary Examiner* — John K Fristoe, Jr.
*Assistant Examiner* — Woody Lee, Jr.
(74) *Attorney, Agent, or Firm* — Cantor Colburn LLP

(57) ABSTRACT

A rotor system includes a first rotor located at a rotor axis that imparts a first axial load and a first moment, and a first shaft connected to the first rotor at the axis. A first bearing connects a gearbox to the first shaft, transferring the first axial load from the first shaft to the gearbox. A second rotor located at the axis imparts a second axial load and a second moment. A second shaft is connected to the second rotor at the axis, the second shaft coaxial with the first rotor. A second bearing connects the gearbox to the second shaft, transferring the second axial load from the second shaft to the gearbox. A nonrotating standpipe is located at the axis radially between the first shaft and the second shaft. An intershaft bearing located at the standpipe reacts the first and second moments using the first and second bearings.

21 Claims, 3 Drawing Sheets

(56) References Cited

U.S. PATENT DOCUMENTS

| | | |
|---|---|---|
| 6,540,570 B1 | 4/2003 | Eakin |
| 6,886,777 B2 | 5/2005 | Rock |
| 7,118,340 B2 | 10/2006 | D'Anna |
| 7,946,526 B2 | 5/2011 | Zimet |
| 2006/0269411 A1* | 11/2006 | Bertolotti .................. B64C 1/00 416/134 A |
| 2007/0181741 A1 | 8/2007 | Darrow, Jr. et al. |
| 2009/0084891 A1* | 4/2009 | Darrow, Jr. ............... B64C 7/00 244/17.19 |
| 2012/0156033 A1 | 6/2012 | Cowles |
| 2013/0052034 A1 | 2/2013 | Lonergan et al. |

* cited by examiner

COUNTER-ROTATING ROTOR SYSTEM WITH STATIONARY STANDPIPE

BACKGROUND

The subject matter disclosed herein relates to the art of rotary wing aircraft and, more specifically, to coaxial multi-rotor systems for rotary wing aircraft.

In typical rotary winged aircraft, for example, helicopters with dual coaxial rotor systems, rotary power is transmitted from an engine through a gearbox into the rotor system. The gearbox transfers power to a lower rotor shaft to drive a lower rotor assembly and to an upper rotor shaft coaxial with the lower rotor shaft to drive the upper rotor assembly. The systems typically include several sets of bearings between the upper rotor shaft and lower rotor shaft to transfer loads between the shafts and to the housings. The bearings and controls for the upper rotor assembly drive an increased diameter for the upper rotor shaft, and thus the lower rotor shaft, which increases drag during operation. As such, many coaxial rotor systems include an aerodynamic fairing positioned between the upper rotor assembly and the lower rotor assembly. Typical systems attach to the upper and lower rotor shafts and include a significant derotation mechanism to prevent the fairing from rotating with respect to the airframe, and to keep the fairing oriented in a selected direction.

In one embodiment, a coaxial, dual rotor system connected to a gearbox includes a first rotor assembly is located at a rotor axis and which imparts a first axial load and a first moment and a first rotor shaft operably connected to the first rotor assembly at the rotor axis to drive rotation of the first rotor assembly about the rotor axis. A first bearing assembly connects the gearbox to the first rotor shaft and transfers the first axial load from the first rotor shaft to the gearbox. A second rotor assembly is located at the rotor axis and imparts a second axial load and a second moment. A second rotor shaft is operably connected to the second rotor assembly at the rotor axis to drive rotation of the second rotor assembly about the rotor axis, the second rotor shaft coaxial with and radially offset from the first rotor shaft. A second bearing assembly connects the gearbox to the second rotor shaft and transfers the second axial load from the second rotor shaft to the gearbox. A nonrotating standpipe is located at the rotor axis radially between the first rotor shaft and the second rotor shaft. An intershaft bearing assembly is located at the standpipe and transfers the first and second moments from the first rotor assembly and the second rotor assembly to the standpipe using the first and second bearing assemblies.

In another embodiment, a dual coaxial rotor rotorcraft includes an airframe and a drive system including a gearbox located at the airframe. A dual coaxial rotor system is operably connected to the drive system. The rotor system includes a first rotor assembly is located at a rotor axis and which imparts a first axial load and a first moment and a first rotor shaft operably connected to the first rotor assembly at the rotor axis to drive rotation of the first rotor assembly about the rotor axis. A first bearing assembly connects the gearbox to the first rotor shaft and transfers the first axial load from the first rotor shaft to the gearbox. A second rotor assembly is located at the rotor axis and imparts a second axial load and a second moment. A second rotor shaft is operably connected to the second rotor assembly at the rotor axis to drive rotation of the second rotor assembly about the rotor axis, the second rotor shaft coaxial with and radially offset from the first rotor shaft. A second bearing assembly connects the gearbox to the second rotor shaft and transfers the second axial load from the second rotor shaft to the gearbox. A nonrotating standpipe is located at the rotor axis radially between the first rotor shaft and the second rotor shaft. An intershaft bearing assembly is located at the standpipe and transfers the first and second moments from the first rotor assembly and the second rotor assembly to the standpipe using the first and second bearing assemblies.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
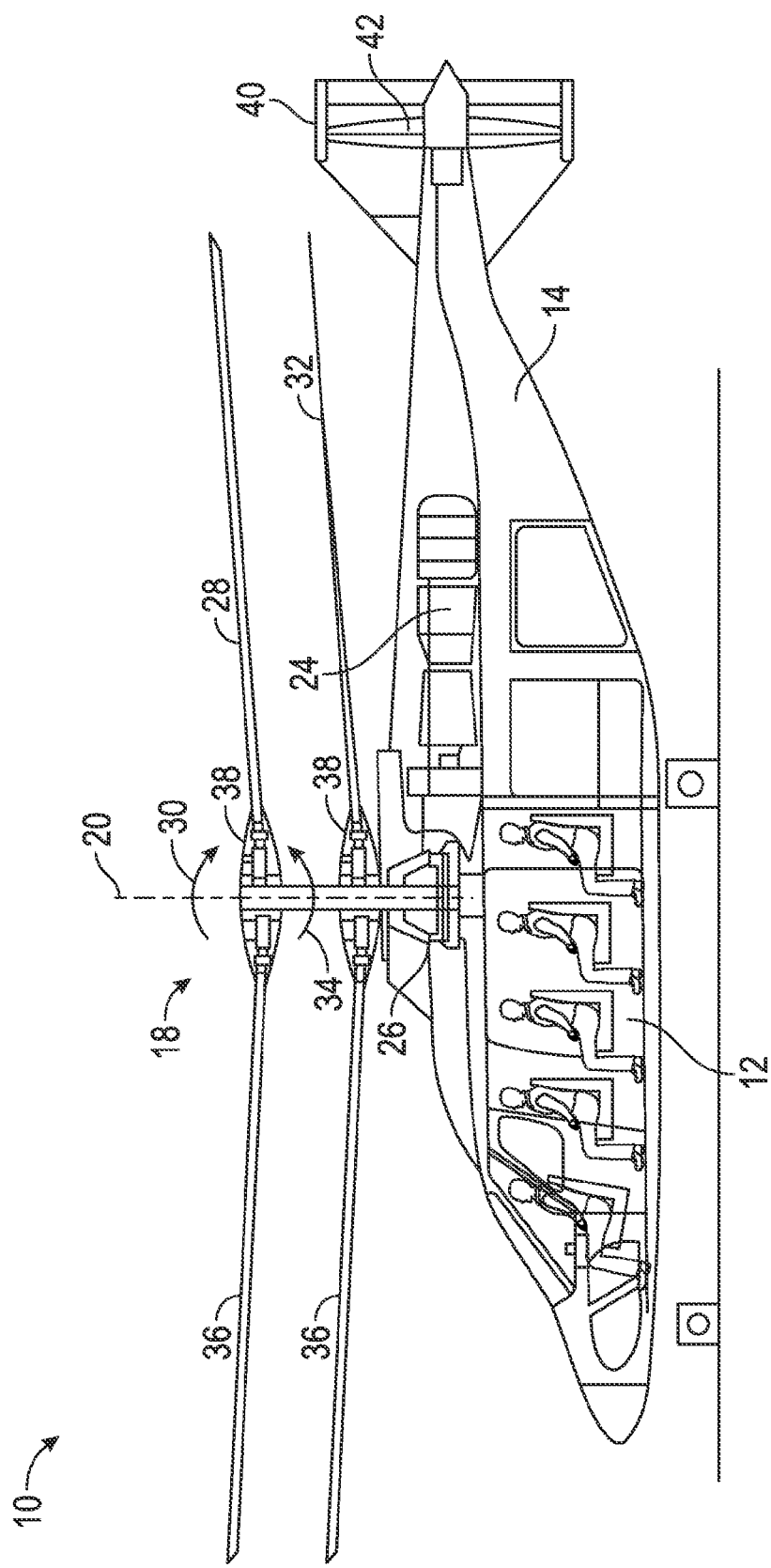
FIG. 1 is a schematic view of an embodiment of a rotary wing aircraft.

Shown in FIG. 1 is schematic view of an embodiment of a rotary wing aircraft, in this embodiment a helicopter 10. The helicopter 10 includes an airframe 12 with an extending tail 14. A dual, counter rotating coaxial main rotor assembly 18 is located at the airframe 12 and rotates about a main rotor axis 20. The main rotor assembly 18 is driven by a power source, for example, an engine 24 via a gearbox 26. The main rotor assembly 18 includes an upper rotor assembly 28 driven in a first direction 30 about the main rotor axis 20, and a lower rotor assembly 32 driven in a second direction 34 about the main rotor axis 20, opposite to the first direction 30. While, in FIG. 1, the first direction 30 is illustrated as counter-clockwise and the second direction 34 is illustrated as clockwise (when looking downward), it is to be appreciated that in some embodiments the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the helicopter 10 further includes a translational thrust system 40 located at the extending tail 14 to provide translational thrust for the helicopter 10. The translational thrust system 40 includes a propeller rotor 42 connected to and driven by the engine 24 via the gearbox 26. While shown in the context of a pusher-prop configuration, it is understood that the propeller rotor 42 could also be more conventional puller prop or could be variably facing so as to provide yaw control in addition to or instead of translational thrust.

Figure 2:
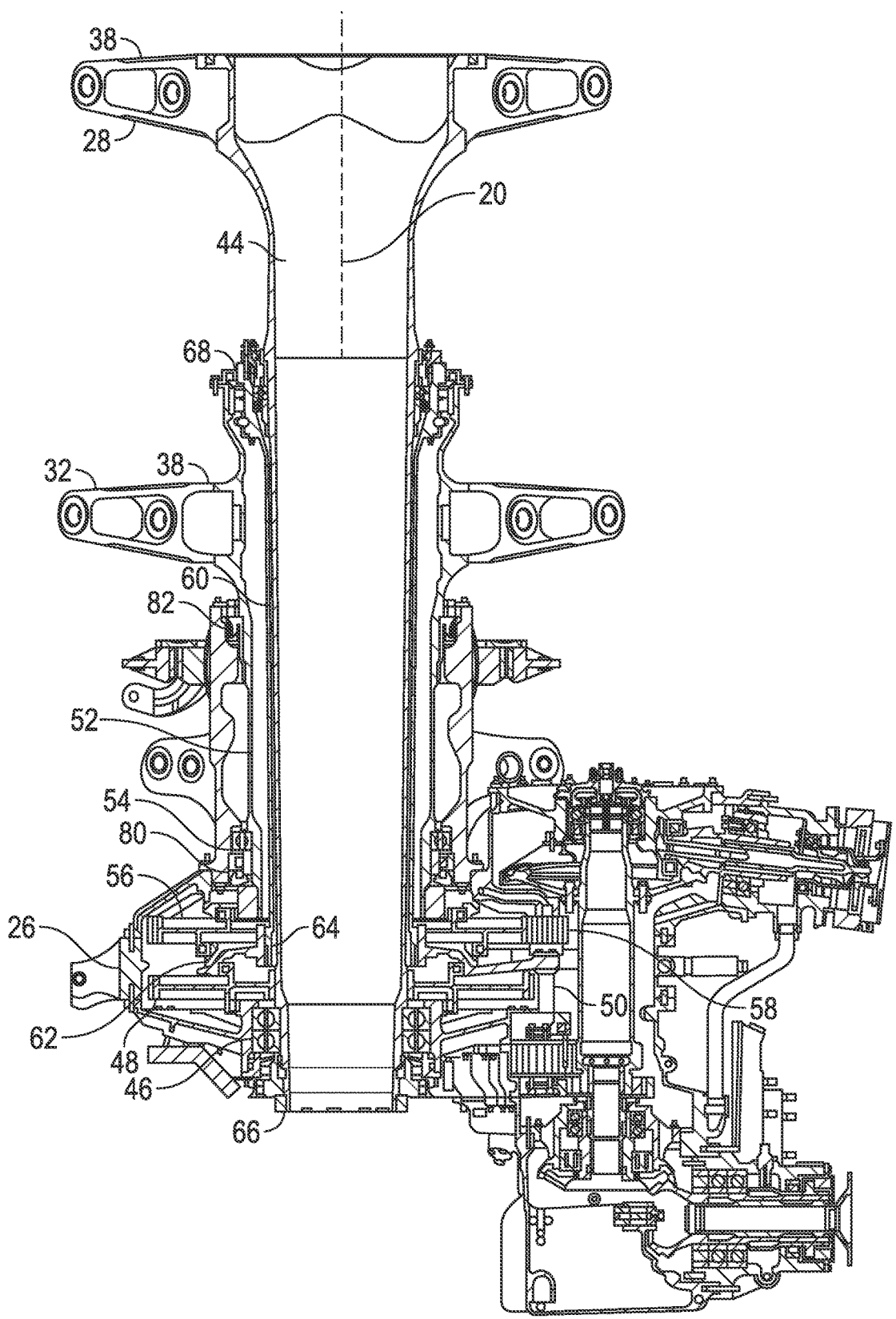
FIG. 2 is a cross-sectional view of an embodiment of a dual coaxial rotor system and gearbox.

Referring to FIG. 2, the upper rotor assembly 28 is driven by an upper rotor shaft 44 axially supported at the gearbox 26 by an upper rotor bearing 46. At the gearbox 26, a lower bull gear 48 mated to the upper rotor shaft 44 is driven via a lower output pinion 50 thus driving rotation of the upper rotor shaft 44 and the upper rotor assembly 28. Similarly, lower rotor assembly 32 is connected to and driven by a lower rotor shaft 52, which is coaxial with the upper rotor shaft 44 and located radially outboard of the upper rotor shaft 44. The lower rotor shaft 52 is axially supported at the gearbox 26 by a lower rotor bearing 54 set, and is connected to an upper bull gear 56 driven by an upper output pinion 58. While the gearbox 26 in the present embodiment includes bull gears 48 and 56, it is merely exemplary. Other gear types, such as spiral bevel gears, may be utilized. A stationary standpipe 60 is coaxial with the upper rotor shaft 44 and the lower rotor shaft 52, and is located radially between the upper rotor shaft 44 and the lower rotor shaft 52. The standpipe 60 is fixed to a non-rotating part of the gearbox 26, for example, a gearbox housing 62, via, in some embodiments a spline connection 64. The standpipe 60 extends along the main rotor axis 20, terminating between the upper rotor assembly 28 and the lower rotor assembly 32.

The upper rotor shaft 44 transfers lift loads to the gearbox 26 via the upper rotor bearing 46 at a base 66 of the upper rotor shaft 44. Upper rotor assembly 28 moment loads are coupled at the upper rotor bearing 46 and at an intershaft shear bearing 68 located between the upper rotor shaft 44 and the standpipe 60 at an upper end of the lower rotor shaft 52 to transfer loads from the upper rotor shaft into the standpipe. The lower rotor shaft 44 transfers lift loads into the gearbox 26 via lower rotor bearing 54 located at a base of the lower rotor shaft 44. Lower rotor assembly 32 moment loads are coupled between the lower shaft bearings 80 and 82 at the lower rotor shaft 52.

Figure 3:
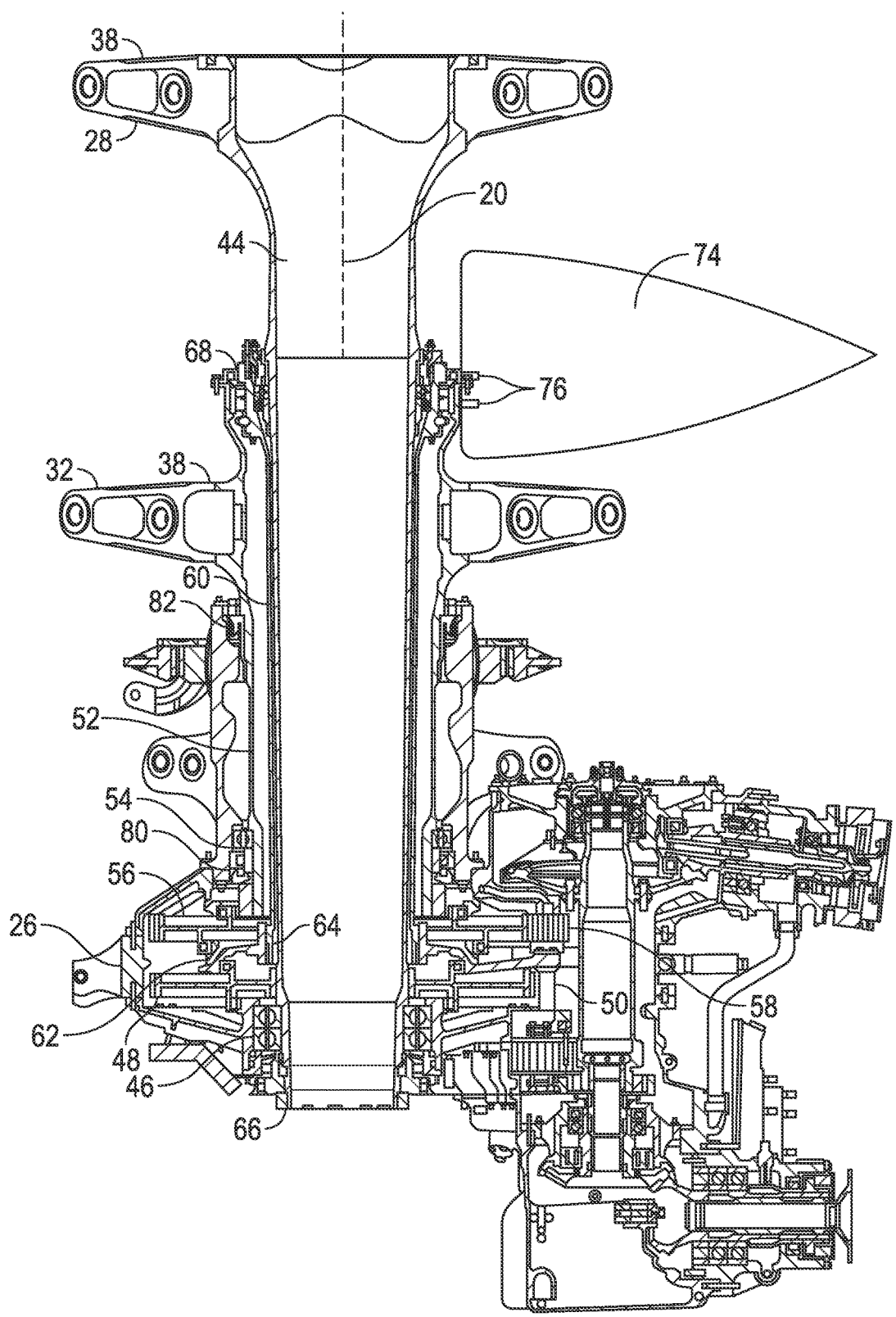
FIG. 3 is a cross-sectional view of another embodiment of a dual coaxial rotor system and gearbox.

Referring now to FIG. 3, the standpipe 60 provides a nonrotating structure at which to mount an aerodynamic fairing 74 between the upper rotor assembly 28 and the lower rotor assembly 32. To facilitate installation of the fairing 74, the standpipe 60 may include, for example, an arrangement of studs or bolts 76, which align with openings (not shown) in the fairing 74 and are used to secure the fairing 74 to the standpipe 60. While shown as empty, it is understood that the fairing 74 could be solid, or can house electronics or other boxes. While in the embodiment shown, a fairing 74 is installed on the standpipe 60, it is to be appreciated that the standpipe 60 may be utilized to locate and secure various nonrotating elements, such as RADAR domes, slip rings, LIDAR equipment, or other electronic or mechanical equipment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies, turbines, and/or fans. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A coaxial, dual rotor system connected to a gearbox, the system comprising:
a first rotor assembly disposed at a rotor axis and which imparts a first axial load and a first moment;
a first rotor shaft operably connected to the first rotor assembly at the rotor axis to drive rotation of the first rotor assembly about the rotor axis;
a first bearing assembly connecting the gearbox to the first rotor shaft and which transfers the first axial load from the first rotor shaft to the gearbox;
a second rotor assembly disposed at the rotor axis and which imparts a second axial load and a second moment;
a second rotor shaft operably connected to the second rotor assembly at the rotor axis to drive rotation of the second rotor assembly about the rotor axis, the second rotor shaft coaxial with and radially offset from the first rotor shaft;
a second bearing assembly connecting the gearbox to the second rotor shaft and which transfers the second axial load from the second rotor shaft to the gearbox;
a nonrotating standpipe disposed at the rotor axis radially between the first rotor shaft and the second rotor shaft;
an intershaft bearing assembly disposed at the standpipe and which transfers the first and second moments from the first rotor assembly and the second rotor assembly to the standpipe using the first and second bearing assemblies; and
an aerodynamic fairing secured to the standpipe between the first rotor assembly and the second rotor assembly via a plurality of fasteners extending from the standpipe.

2. The rotor system of claim 1, wherein the standpipe terminates along the rotor axis between the first rotor assembly and the second rotor assembly.

3. The rotor system of claim 1, further comprising one or more bearings disposed between the first rotor shaft and the standpipe to transfer loads therebetween.

4. The rotor system of claim 1, further comprising one or more bearings between disposed between the second rotor shaft and the standpipe to transfer loads therebetween.

5. The rotor system of claim 1, further comprising a first rotor shaft bearing disposed at a base of the first rotor shaft and supportive thereof.

6. The rotor system of claim 1, further comprising a second rotor shaft bearing disposed at a base of the second rotor shaft and supportive thereof.

7. The rotor system of claim 1, wherein the first rotor assembly rotates in a first direction about the rotor axis, and the second rotor assembly rotates in a second direction opposite the first direction about the rotor axis.

8. The rotor system of claim 1, wherein the standpipe is secured at a base of the standpipe to prevent rotation thereof about the rotor axis.

9. The rotor system of claim 1, wherein the first rotor shaft is disposed radially inboard of the second rotor shaft.

10. A dual coaxial rotor rotorcraft comprising:
an airframe;
a drive system including a gearbox disposed at the airframe; and
a dual coaxial rotor system operably connected to the drive system comprising:
a first rotor assembly disposed at a rotor axis and which imparts a first axial load and a first moment;
a first rotor shaft operably connected to the first rotor assembly at the rotor axis to drive rotation of the first rotor assembly about the rotor axis;
a first bearing assembly connecting the gearbox to the first rotor shaft and which transfers the first axial load from the first rotor shaft to the gearbox;
a second rotor assembly disposed at the rotor axis and which imparts a second axial load and a second moment;

a second rotor shaft operably connected to the second rotor assembly at the rotor axis to drive rotation of the second rotor assembly about the rotor axis, the second rotor shaft coaxial with and radially offset from the first rotor shaft;

a second bearing assembly connecting the gearbox to the second rotor shaft and which transfers the second axial load from the second rotor shaft to the gearbox;

a nonrotating standpipe disposed at the rotor axis radially between the first rotor shaft and the second rotor shaft;

an intershaft bearing assembly disposed at the standpipe and which transfers the first and second moments from the first rotor assembly and the second rotor assembly to the standpipe using the first and second bearing assemblies; and an aerodynamic fairing secured to the standpipe between the first rotor assembly and the second rotor assembly via a plurality of fasteners extending from the standpipe.

11. The rotorcraft of claim 10, wherein the standpipe terminates along the rotor axis between the first rotor assembly and the second rotor assembly.

12. The rotorcraft of claim 10, further comprising one or more bearings disposed between the first rotor shaft and the standpipe to transfer loads therebetween.

13. The rotorcraft of claim 10, further comprising one or more bearings between disposed between the second rotor shaft and the standpipe to transfer loads therebetween.

14. The rotorcraft of claim 10, further comprising a first rotor shaft bearing disposed at a base of the first rotor shaft and supportive thereof.

15. The rotorcraft of claim 10, further comprising a second rotor shaft bearing disposed at a base of the second rotor shaft and supportive thereof.

16. The rotorcraft of claim 10, wherein the first rotor assembly rotates in a first direction about the rotor axis, and the second rotor assembly rotates in a second direction opposite the first direction about the rotor axis.

17. The rotorcraft of claim 10, wherein the standpipe is secured at a base of the standpipe to prevent rotation thereof about the rotor axis.

18. The rotorcraft of claim 17, wherein the standpipe is secured to a component of the drive system.

19. The rotorcraft of claim 17, wherein the standpipe is secured at its base via a spline connection.

20. The rotorcraft of claim 10, wherein the first rotor assembly is an upper rotor assembly and the second rotor assembly is a lower rotor assembly.

21. The rotorcraft of claim 10, wherein the first rotor shaft is disposed radially inboard of the second rotor shaft.

* * * * *